United States Patent
Wang et al.

(10) Patent No.: US 9,958,745 B2
(45) Date of Patent: May 1, 2018

(54) LIGHT-ON DETECTION DEVICE AND LIGHT-ON DETECTION METHOD

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Meixu Wang, Beijing (CN); Song Wu, Beijing (CN)

(73) Assignees: BOE TECHNOLOGY GROUP CO., LTD. (CN); HEFEI XINSHENG OPTOELECTRONICS TECHNOLOGY CO., LTD. (CN)

(*) Notice: Subject to any disclaimer, the term of this patent is extended or adjusted under 35 U.S.C. 154(b) by 366 days.

(21) Appl. No.: 14/803,213

(22) Filed: Jul. 20, 2015

(65) Prior Publication Data
US 2016/0161549 A1   Jun. 9, 2016

(30) Foreign Application Priority Data

Dec. 9, 2014  (CN) .......................... 2014 1 0751913

(51) Int. Cl.
*G01R 3/00*    (2006.01)
*G02F 1/1362*  (2006.01)
*G02F 1/1345*  (2006.01)

(52) U.S. Cl.
CPC .......... *G02F 1/1362* (2013.01); *G02F 1/1345* (2013.01); *G02F 2001/136254* (2013.01); *G02F 2201/48* (2013.01)

(58) Field of Classification Search
CPC .... G01R 3/00; G01R 31/2601; G01R 1/0416; G01R 1/06722; G01R 1/07314;
(Continued)

(56) References Cited

U.S. PATENT DOCUMENTS 5,742,173 A * 4/1998 Nakagomi .......... G01R 1/06705
                                                  324/750.2
5,990,692 A * 11/1999 Jeong ................. G01R 31/2886
                                                  324/754.08
(Continued)

FOREIGN PATENT DOCUMENTS

CN    101294984 A    10/2008
CN    201464595 U     5/2010
(Continued)

OTHER PUBLICATIONS

Office Action in Chinese Patent Application No. 201410751913.7, dated May 26, 2016.
(Continued)

*Primary Examiner* — Jermele M Hollington
*Assistant Examiner* — Taqi Nasir
(74) *Attorney, Agent, or Firm* — Brooks Kushman P.C.

(57) ABSTRACT

The present disclosure provides a light-on detection device and a light-on detection method. The light-on detection device includes a substrate, and a probe block provided with probes and connected to the substrate. The light-on detection device further includes a flattening element configured to apply a force onto a surface of the display panel so as to change the surface of the display panel from a first shape having a first height difference to a second shape having a second height difference less than the first height difference, thereby to enable the probes to perform the light-on detection on the display panel with the second shape.

16 Claims, 4 Drawing Sheets

(58) Field of Classification Search
CPC .. G01R 1/0408; G01R 1/067; G01R 31/2886; G01R 31/2889
USPC ............... 324/437, 446–447, 754.01–754.11, 324/755.01–758.01, 690, 696, 762.01, 324/762.05, 765, 750.01
See application file for complete search history.

(56) References Cited

U.S. PATENT DOCUMENTS

| | | | | |
|---|---|---|---|---|
| 6,048,750 | A * | 4/2000 | Hembree | H01L 21/681 438/107 |
| 8,382,941 | B2 * | 2/2013 | Harrington | H01J 37/32091 156/345.43 |
| 8,759,715 | B2 * | 6/2014 | Narayanan | B23K 9/092 219/130.51 |
| 2009/0166248 | A1 * | 7/2009 | Onda | H01L 21/67369 206/587 |
| 2009/0174866 | A1 * | 7/2009 | Okada | G03B 21/20 353/52 |
| 2009/0194866 | A1 * | 8/2009 | Jobetto | H01L 24/82 257/700 |
| 2010/0100119 | A1 * | 4/2010 | Herndon | A61H 15/0078 606/201 |
| 2015/0044931 | A1 * | 2/2015 | Mo | G02F 1/1393 445/6 |

FOREIGN PATENT DOCUMENTS

| | | |
|---|---|---|
| CN | 201853025 U | 6/2011 |
| CN | 102636911 A | 8/2012 |
| CN | 202976773 U | 6/2013 |
| KR | 10-2008-0000999 A | 1/2008 |

OTHER PUBLICATIONS

Third Office Action for Chinese Application No. 201410751913.7, dated Jul. 31, 2017, 7 Pages.

* cited by examiner

| Applying, by a flattening element, a force onto a surface of a display panel so as to change the surface of the display panel from a first shape having a first height difference to a second shape having a second height difference less than the first height difference |
|---|
| Performing, by probes, light-on detection on the display panel with the second shape |

LIGHT-ON DETECTION DEVICE AND LIGHT-ON DETECTION METHOD

CROSS-REFERENCE TO RELATED APPLICATION

The present application claims a priority of the Chinese patent application No. 201410751913.7 filed on Dec. 9, 2014, which is incorporated herein by reference in its entirety.

TECHNICAL FIELD

The present disclosure relates to the field of display technology, in particular to a light-on detection device and a light-on detection method.

BACKGROUND

During the manufacture of a display panel, several detection processes, e.g., a light-on detection process after the cell formation of the display panel, are required so as to detect deficiencies.

During the light-on detection, it is required to transmit each data signal and each gate signal separately to each corresponding pad on the display panel. As shown in FIG. 1, which is a schematic view showing an existing light-on detection device, during the detection, a probe 12 in a probe block 11 of the light-on detection device is in contact with the corresponding pad on the display panel 14, so as to transmit a detection signal from a lead to the display panel 14.

The probe 12 is of low rigidity, so the display panel 14 must be of flatness sufficient to ensure that the detection signal can be inputted into the display panel 14 uniformly, so as to light on the display panel 14.

As shown in FIG. 1, the probe block 11 is secured onto a probe block base 13, and the probe 12 in the probe block 11 is in contact with the pad on the display panel, so as to transmit the detection signal to the display panel, thereby to light on the display panel and detect whether or not the display panel is a non-defective one.

The probe block 11 is of a very precise structure. FIG. 2 is a schematic view showing the appearance of the probe block 11, and FIG. 3 is a front view of the probe 12 in the probe block 11. Usually, a tip of the probe 12 is made of gold, and of a thickness about 10 µm and a width of about 20 µm. Due to the small thickness and small width, the probe 12 will be damaged somewhat every time when it is in contact with and separated from the pad on the display panel.

Currently, a size of the display panel becomes larger and larger, and for a large-sized display panel, when it is not so flat, e.g., when a corner is tilted or there is a depression in the middle of an edge, different forces will be applied to the probes 12 in the probe block 11 during the light-on detection, and some probes 12 will be over-pressurized and thereby damaged. As a result, a service life of the probe will be reduced and a detection effect will be adversely affected.

SUMMARY

An object of the present disclosure is to provide a light-on detection device and a light-on detection method, so as to flatten a display panel before a probe is in contact with the display panel, thereby to prolong a service life of the probe and ensure a light-on detection effect.

In one aspect, the present disclosure provides in one embodiment a light-on detection device for testing a display panel, including a substrate, and a probe block provided with probes and connected to the substrate. The light-on detection device further includes a flattening element configured to apply a force onto a surface of the display panel so as to change the surface of the display panel from a first shape having a first height difference to a second shape having a second height difference less than the first height difference, thereby to enable the probes to perform the light-on detection on the display panel with the second shape.

Alternatively, the device further includes a supporting element configured to support the flattening element, a first end of which is connected to the substrate, and a second end of which is connected to the flattening element.

Alternatively, the device includes a plurality of supporting elements, and the second end of each supporting element is connected to one flattening element, or the plurality of supporting elements is connected to an identical flattening element.

Alternatively, the supporting element and the probe block are driven separately so as to be in contact with the display panel.

Alternatively, the supporting element and the probe block are arranged in such a manner that the supporting element is driven to move toward the display panel, and after the flattening element is in contact with the display panel, the probe block is driven to move toward the display panel.

Alternatively, the flattening element is arranged at a side of the probe block facing a region of the display panel where the probe is in contact with the display panel.

Alternatively, the flattening element is arranged closer to the display panel at a predetermined distance relative to the probe.

Alternatively, the flattening element is arranged within the probe block.

Alternatively, the flattening element and the probe are arranged sequentially in a horizontal direction.

Alternatively, the device includes a plurality of probe blocks, and each probe block is connected to one flattening element, or the plurality of probe blocks is connected to an identical flattening element.

Alternatively, the flattening element is made of a rigid or elastic insulating material.

Alternatively, the flattening element is made of anti-static rubber.

Alternatively, when the flattening element is made of an elastic insulating material, a distance between a tip of the probe and the display panel is less than or equal to a distance between a side surface of the flattening element to be in contact with the display panel and the display panel.

Alternatively, the flattening element is provided with via-holes, and the probe is received within each via-hole.

Alternatively, the flattening element is of any geometrical shape.

In another aspect, the present disclosure provides in one embodiment a light-on detection method for performing light-on detection on a display panel using the above-mentioned light-on detection device, including steps of: applying, by a flattening element, a force onto a surface of the display panel so as to change the surface of the display panel from a first shape having a first height difference to a second shape having a second height difference less than the first height difference; and performing, by probes, the light-on detection on the display panel with the second shape.

Alternatively, the light-on detection device further includes a supporting element configured to support the flattening element, a first end of which is connected to the substrate, and a second end of which is connected to the flattening element. The method further includes driving the supporting element and a probe block separately so as to enable the supporting element and the probe block to be in contact with the display panel.

Alternatively, the step of driving the supporting element and the probe block separately so as to enable the supporting element and the probe block be in contact with the display panel includes driving the supporting element to move toward the display panel, and after the flattening element is in contact with the display panel, driving the probe block to move toward the display panel.

According to the light-on detection device and the light-on detection method in the embodiments of the present disclosure, the flattening element is provided so as to apply a force onto the surface of the display panel, thereby to change the surface of the display panel from the first shape having the first height difference to the second shape having the second height difference less than the first height difference, and enable the probes to perform the light-on detection on the display panel with the second shape. As a result, it is able to flatten the display panel before the probes are in contact with the display panel, thereby to prolong the service life of the probes and ensure the light-on detection effect.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
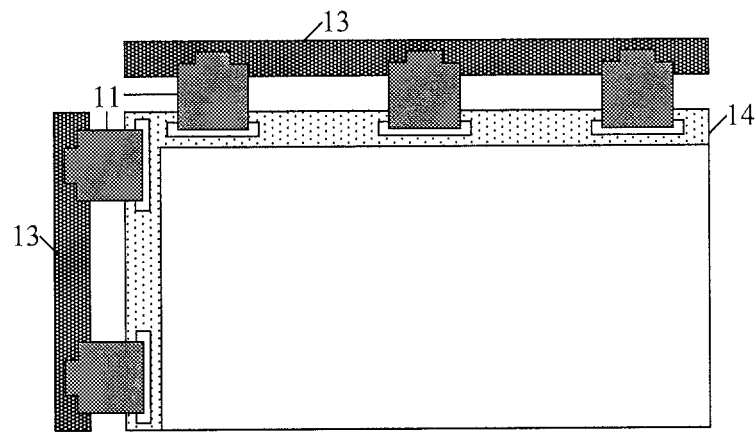
FIG. 1 is a schematic view showing an existing light-on detection device.
Figure 2:
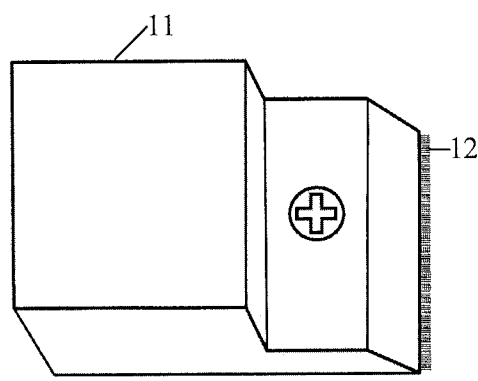
FIG. 2 is a schematic view showing an existing probe block.
Figure 3:
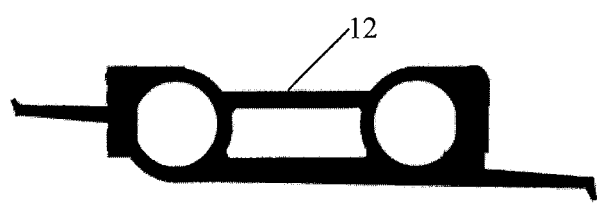
FIG. 3 is a schematic view showing an existing probe.
Figure 4:
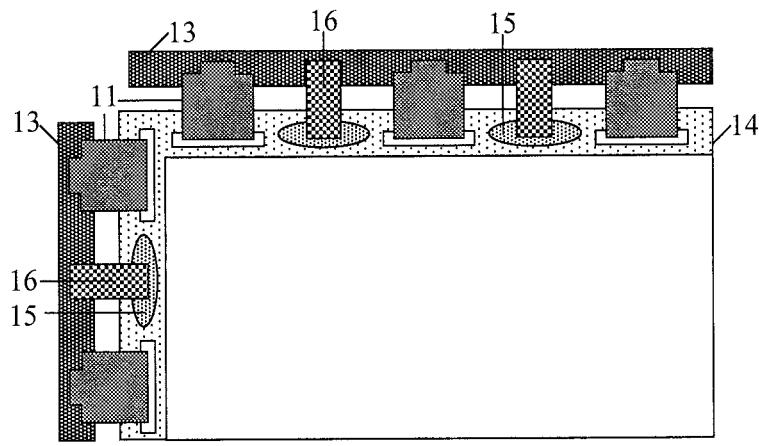
FIG. 4 is a schematic view showing a light-on detection device according to one embodiment of the present disclosure.

As shown in FIG. 4, the present disclosure provides in one embodiment a light-on detection device for testing a display panel, which may include a substrate 13, and a probe block 11 provided with probes 12 and connected to the substrate 13. The light-on detection device may further include a flattening element 15 configured to apply a force onto a surface of the display panel so as to change the surface of the display panel 14 from a first shape having a first height difference to a second shape having a second height difference less than the first height difference, thereby to enable the probes 12 to perform the light-on detection on the display panel 14 with the second shape.

According to the light-on detection device in the embodiments of the present disclosure, by using the flattening element 15, it is able to flatten the display panel 14 to be within an appropriate range, e.g., to enable the surface of the display panel 14 to be parallel to a horizontal surface or to enable the height difference of the surface of the display panel 14 to be within a predetermined range, before the probes 12 are in contact with the display panel 14, thereby to prolong the service life of the probes 12 and ensure the light-on detection effect.

Figure 5:
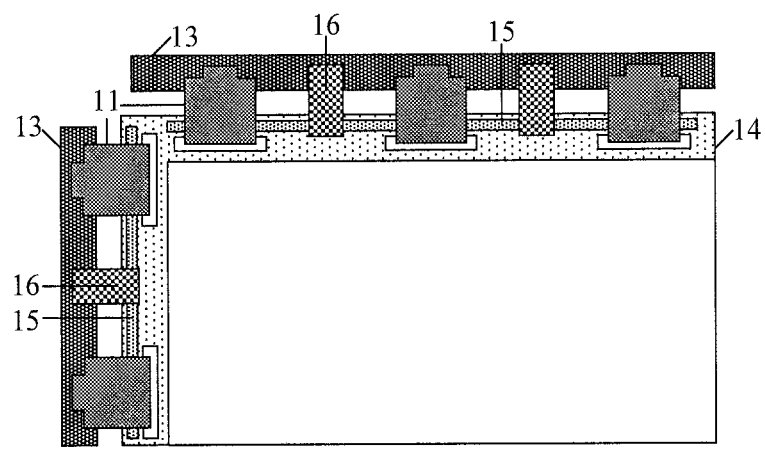
FIG. 5 is another schematic view showing a light-on detection device according to one embodiment of the present disclosure.

As shown in FIGS. 4 and 5, the light-on detection device may further include a supporting element 16 configured to support the flattening element 15, a first end of which is connected to the substrate 13, and a second end of which is connected to the flattening element 15.

In the embodiments of the present disclosure, the light-on detection device may include a plurality of supporting elements 16. In an alternative embodiment, as shown in FIG. 4, one flattening element 15 is arranged at a second end of each supporting element 16, i.e., at an end adjacent to the display panel 14. In another alternative embodiment, as shown in FIG. 5, the plurality of supporting elements 16 is connected to an identical flattening element 15, i.e., merely one flattening element 15 with a relatively large length is arranged at a side of the light-on detection device adjacent to the display panel 14 and connected to all the supporting elements 16 arranged at a side of the light-on detection device.

For the light-on detection device in both FIGS. 4 and 5, before the probe 12 is in contact with the display panel 14, it is able to flatten the surface of the display panel by the flattening element 15, i.e., to change the surface of the display panel 14 from the first shape having the first height difference to the second shape having the second height difference less than the first height difference, thereby to enable the probe 12 to be in contact with a relatively flat contact point and perform the light-on detection. In this way, it is able to prevent uneven forces applied to the probes 12 due to the non-flat surface of the display panel 14, thereby to prolong the service life of the probes 12 and ensure the light-on detection effect.

In order to enable the flattening element 15 to be in contact with the surface of the display panel 14 prior to the probes 12, the flattening element 15 may be arranged closer to the display panel 14 at a predetermined distance relative to the probe 12, i.e., the flattening element 15 must be in contact with a side surface of the display panel 14 and there is a height difference between the flattening element 15 and a tip of the probe 12. In this way, when the supporting element 16 and the probe block 11 are driven together, it is able not only to cause the flattening element 15 to be in contact with the surface of the display panel 14 prior to the probe 12 so as to flatten the surface of the display panel 14, but also not to affect contact of the probe 12 with the pad at the surface of the display panel 14 due to the appropriate height difference.

In another embodiment, the supporting element 16 and the probe block 11 may be driven separately so as to be in contact with the display panel 14, respectively, i.e., one driver (not shown) may be used to drive the supporting element 16 to move toward the display panel, and after the flattening element 15 is in contact with the display panel 14, drive the probe block 11 to move toward the display panel 14, so that the surface of the display panel 14 has been flattened by the flattening element 15 when the probe 11 is in contact with the display panel 14.

Figure 6:
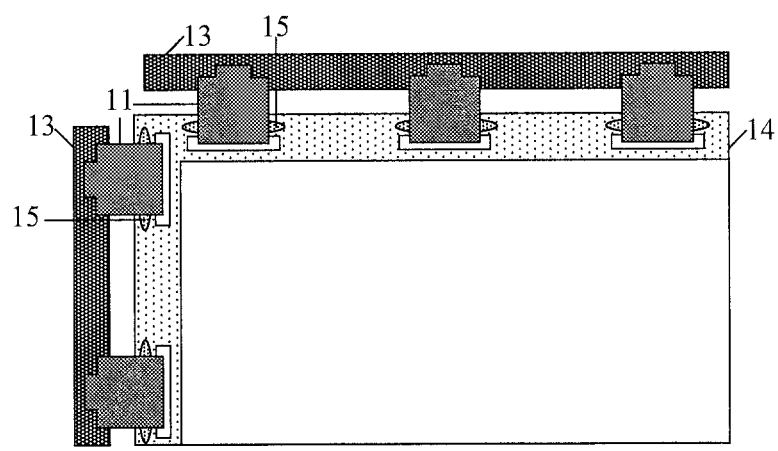
FIG. 6 is yet another schematic view showing a light-on detection device according to one embodiment of the present disclosure.
Figure 7:
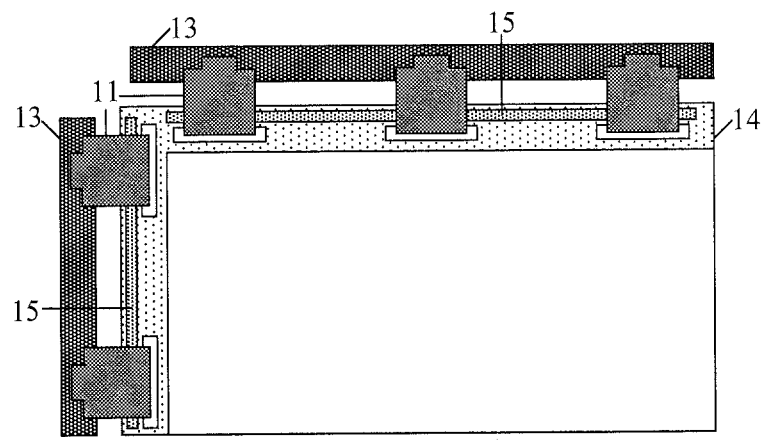
FIG. 7 is still yet another schematic view showing a light-on detection device according to one embodiment of the present disclosure.
Figure 8:
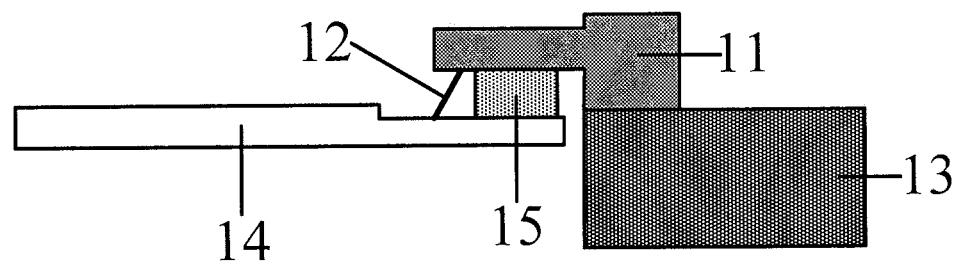
FIG. 8 is still yet another schematic view showing a light-on detection device according to one embodiment of the present disclosure.

In another embodiment, as shown in FIGS. 6, 7 and 8, the flattening element 15 may also be arranged within the probe block 11. To be specific, the flattening element 15 may be arranged at a side of the probe block 11 facing a region where the probe 12 is in contact with the display panel, i.e., arranged at a side identical to the probe 12.

In order not to affect the contact of the probe 12 with the display panel 14, as shown in FIG. 8, the flattening element 15 and the probe 12 may be arranged sequentially in a horizontal direction.

In this embodiment, a side surface of the flattening element 15 to be in contact with the display panel 14 may be arranged closer to the display panel 14 relative to the tip of the probe 12 (similar to the embodiments shown by FIGS. 4 and 5), i.e., there is a height difference between the side surface of the flattening element 15 and the probe 12. Due to this height difference, it is able not only to ensure that the flattening element 15 is in contact with the surface of the display panel 14 prior to the probe 12 so as to flatten the surface of the display panel 14, but also to ensure that the probe 12 can be in contact with the contact point at the surface of the display panel 14 after the flattening element 15 is in contact with the display panel 14.

In the embodiments of the present disclosure, the light-on detection device may include a plurality of probe blocks 11, and as shown in FIG. 6, each probe block 11 may be connected to one flattening element 15. Alternatively, as shown in FIG. 7, the plurality of probe blocks 11 may be connected to the same flattening element 15, i.e., merely one flattening element 15 is arranged at a side of the light-on detection device adjacent to a side edge of the display panel 14, and the flattening element 15 is connected to all the probe blocks 11 arranged at the side of the light-on detection device.

Figure 9:
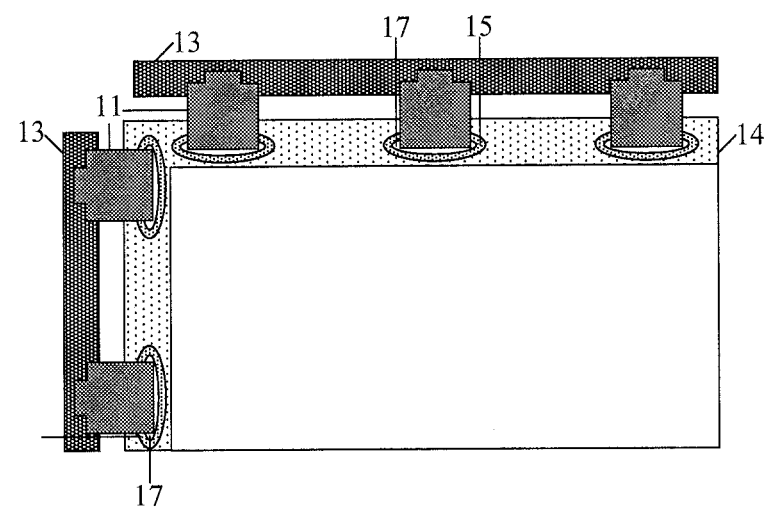
FIG. 9 is still yet another schematic view showing a light-on detection device according to one embodiment of the present disclosure.
Figures 10, 11:
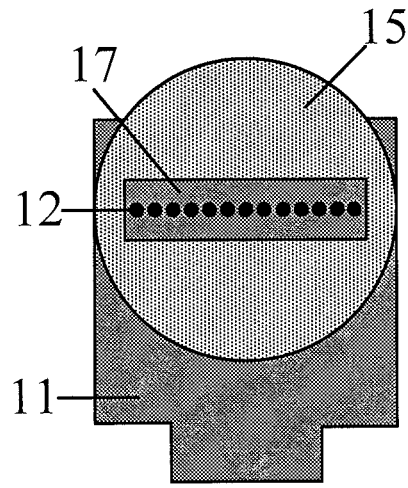
FIG. 10 is still yet another schematic view showing a light-on detection device according to one embodiment of the present disclosure.
FIG. 11 is a flow chart of a light-on detection method according to one embodiment of the present disclosure.

In an alternative embodiment, as shown in FIG. 9, the flattening element 15 may be provided with a via-hole 17. In this way, the flattening element 15 and the probe 12 may be arranged at an identical position of the probe block 11 (as shown in FIG. 10), and the probe 12 may be received within the via-hole 17, i.e., the flattening element 15 surrounds the probe 12.

The flattening element 15 may be made of a rigid or elastic insulating material, e.g., anti-static rubber.

When the flattening element 15 is made of an elastic material, a distance between the tip of the probe 12 and the display panel 14 may be less than a distance between a side surface of the flattening element 15 to be in contact with the display panel 14 and the display panel 14, and the tip of the probe 12 may be in flush with the side surface of the flattening element 15. In this way, it is able to flatten the surface of the display panel 14 and cause the probe 12 to be in contact with the display panel simultaneously.

In the embodiments of the present disclosure, the flattening element 15 may be of any geometrical shape according to the practical need, as long as it is adapted to the display panel where the light-on detection is required.

The present disclosure further provides in one embodiment a light-on detection method for performing light-on detection on the display panel 14 using the above-mentioned light-on detection device.

As shown in FIG. 11, the light-on detection method may include steps of: applying, by the flattening element 15, a force onto the surface of the display panel 14 so as to change the surface of the display panel 14 from the first shape having the first height difference to the second shape having the second height difference less than the first height difference; and performing, by the probes 12, the light-on detection on the display panel with the second shape.

According to the light-on detection device and the light-on detection method in the embodiments of the present disclosure, the flattening element is provided so as to apply a force onto the surface of the display panel, thereby to change the surface of the display panel from the first shape having the first height difference to the second shape having the second height difference less than the first height difference, and enable the probes to perform the light-on detection on the display panel with the second shape. As a result, it is able to flatten the display panel before the probes are in contact with the display panel, thereby to prolong the service life of the probes and ensure the light-on detection effect.

The above are merely the preferred embodiments of the present disclosure. It should be appreciated that, a person skilled in the art may make further modifications and improvements without departing from the principle of the present disclosure, and these modifications and improvements shall also fall within the scope of the present disclosure.

What is claimed is:

1. A light-on detection device for testing a display panel, comprising a substrate, and a probe block provided with probes and connected to the substrate, the light-on detection device further comprising:

a flattening element configured to apply a force onto a surface of the display panel so as to change the surface of the display panel from a first shape having a first height difference to a second shape having a second height difference less than the first height difference, thereby to enable the probes to perform a light-on detection on the display panel with the second shape, wherein the flattening element is arranged at a side of the probe block facing a region of the display panel where the probe is in contact with the display panel, and the flattening element is arranged within the probe block.

2. The light-on detection device according to claim 1, further comprising:

a supporting element configured to support the flattening element, a first end of which is connected to the substrate, and a second end of which is connected to the flattening element.

3. The light-on detection device according to claim 2, wherein there is a plurality of supporting elements, and the second end of each supporting element is connected to one flattening element, or the plurality of supporting elements is connected to an identical flattening element.

4. The light-on detection device according to claim 2, wherein the supporting element and the probe block are driven separately so as to be in contact with the display panel.

5. The light-on detection device according to claim 4, wherein the supporting element and the probe block are arranged in such a manner that the supporting element is driven to move toward the display panel, and after the flattening element is in contact with the display panel, the probe block is driven to move toward the display panel.

6. The light-on detection device according to claim 1, wherein the flattening element is arranged closer to the display panel at a predetermined distance relative to the probe.

7. The light-on detection device according to claim 1, wherein the flattening element and the probe are arranged sequentially in a horizontal direction.

8. The light-on detection device according to claim 1, wherein there is a plurality of probe blocks, and each probe block is connected to one flattening element, or the plurality of probe blocks is connected to an identical flattening element.

9. The light-on detection device according to claim 1, wherein the flattening element is made of a rigid or elastic insulating material.

10. The light-on detection device according to claim 9, wherein the flattening element is made of anti-static rubber.

11. The light-on detection device according to claim 9, wherein when the flattening element is made of an elastic insulating material, a distance between a tip of the probe and the display panel is less than or equal to a distance between a side surface of the flattening element to be in contact with the display panel and the display panel.

12. The light-on detection device according to claim 1, wherein the flattening element is provided with via-holes and the probe is received within each via-hole.

13. The light-on detection device according to claim 9, wherein the flattening element is provided with via-holes and the probe is received within each via-hole.

14. A light-on detection method for performing light-on detection on a display panel using a light-on detection device for testing a display panel comprising a substrate, and a probe block provided with probes and connected to the substrate, the light-on detection device further comprising: a flattening element configured to apply a force onto a surface of the display panel so as to change the surface of the display panel from a first shape having a first height difference to a second shape having a second height difference less than the first height difference, thereby to enable the probes to perform a light-on detection on the display panel with the second shape, wherein the flattening element is arranged at a side of the probe block facing a region of the display panel where the probe is in contact with the display panel, and the flattening element is arranged within the probe block, the method comprising steps of:
applying, by a flattening element, a force onto a surface of the display panel so as to change the surface of the display panel from a first shape having a first height difference to a second shape having a second height difference less than the first height difference; and
performing, by probes, the light-on detection on the display panel with the second shape.

15. The light-on detection method according to claim 14, wherein the light-on detection device further comprises a supporting element configured to support the flattening element, a first end of which is connected to the substrate, and a second end of which is connected to the flattening element,
wherein the method further comprises driving the supporting element and a probe block separately so as to enable the supporting element and the probe block be in contact with the display panel.

16. The light-on detection method according to claim 15, wherein the step of driving the supporting element and the probe block separately so as to enable the supporting element and the probe block be in contact with the display panel comprises:
driving the supporting element to move toward the display panel, and after the flattening element is in contact with the display panel, driving the probe block to move toward the display panel.

\* \* \* \* \*